United States Patent
Marques-Pucheu et al.

(10) Patent No.: US 7,620,014 B1
(45) Date of Patent: Nov. 17, 2009

(54) RADIO COMMUNICATION METHOD BETWEEN A BASE STATION AND MOBILE TERMINALS

(75) Inventors: Gérard Marques-Pucheu, Saint-Marc (FR); Jean Pierre Metais, Plaisir (FR)

(73) Assignee: Eads Secure Networks, Montigney le Bretonneux (FR)

( * ) Notice: Subject to any disclaimer, the term of this patent is extended or adjusted under 35 U.S.C. 154(b) by 0 days.

(21) Appl. No.: 09/979,482

(22) PCT Filed: May 17, 2000

(86) PCT No.: PCT/FR00/01324

§ 371 (c)(1),
(2), (4) Date: Jan. 10, 2002

(87) PCT Pub. No.: WO00/72473

PCT Pub. Date: Nov. 30, 2000

(30) Foreign Application Priority Data

May 19, 1999 (FR) .................................. 99 06345

(51) Int. Cl.
*H04W 4/00* (2009.01)
(52) U.S. Cl. ..................................................... 370/330
(58) Field of Classification Search ................. 370/329, 370/330, 331, 311
See application file for complete search history.

(56) References Cited

U.S. PATENT DOCUMENTS

| | | | |
|---|---|---|---|
| 5,231,635 A | 7/1993 | Travers et al. .............. | 370/95.1 |
| 5,613,206 A * | 3/1997 | Bantz et al. .................. | 455/450 |
| 5,617,412 A | 4/1997 | Delprat et al. .............. | 370/281 |
| 6,016,311 A * | 1/2000 | Gilbert et al. ............... | 370/280 |
| 6,707,842 B2 * | 3/2004 | Rick et al. ................... | 375/142 |
| 6,807,162 B2 * | 10/2004 | Hayashi et al. ............. | 370/335 |
| 6,839,333 B1 * | 1/2005 | Åkerberg .................... | 370/330 |
| 7,440,422 B1 * | 10/2008 | Holma et al. ............... | 370/278 |
| 2001/0043572 A1 * | 11/2001 | Bilgic et al. ................ | 370/281 |

FOREIGN PATENT DOCUMENTS

EP 0480505 4/1992

(Continued)

OTHER PUBLICATIONS

International Search Report dated Jul. 13, 2000 Appl. PCT/FR00/01324.

*Primary Examiner*—Chi H Pham
*Assistant Examiner*—Mohammad S Adhami
(74) *Attorney, Agent, or Firm*—McCraken & Frank LLP

(57) ABSTRACT

Radio signals are transmitted between a base station and mobile terminals. The radio signals are transmitted from the base station to the mobile terminals on a first frequency and are transmitted from the mobile terminals to the base station on a second frequency. The first frequency carries a downlink traffic channel, while the second frequency carries an uplink traffic channel. The first frequency further carries a first downlink signaling channel to a mobile terminal in the transmission phase on the uplink traffic channel, and a second downlink signaling channel to a mobile terminal in the reception phase on the downlink traffic channel. The second frequency further carries a first uplink signaling channel from a mobile terminal in the reception phase on the downlink logical traffic channel and a second uplink signaling channel from a mobile terminal in the transmission phase on the uplink traffic channel.

14 Claims, 7 Drawing Sheets

FOREIGN PATENT DOCUMENTS

| | | |
|---|---|---|
| EP | 0644702 | 3/1995 |
| EP | 0677930 | 10/1995 |
| EP | 0896443 | 2/1999 |
| WO | WO 9610895 | 4/1996 |

* cited by examiner

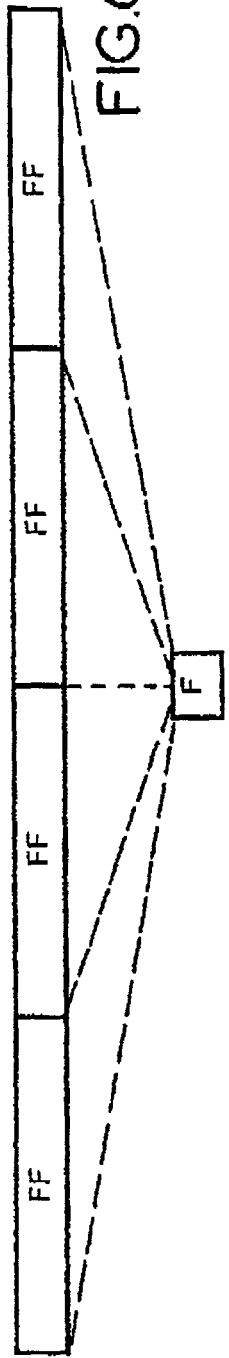
FIG. 3.
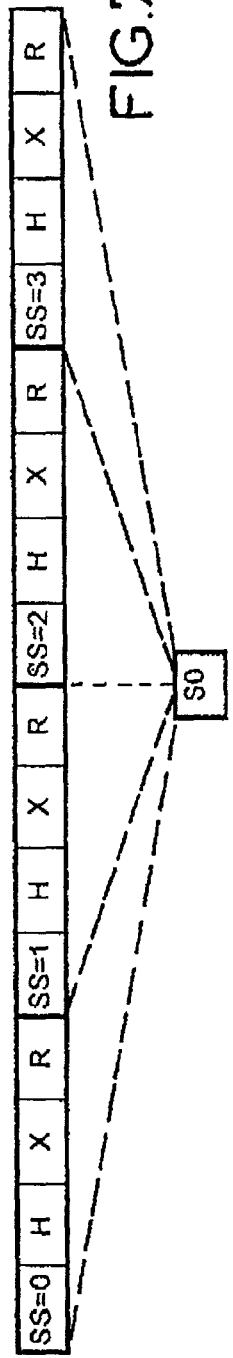
FIG. 6.
FIG. 7.

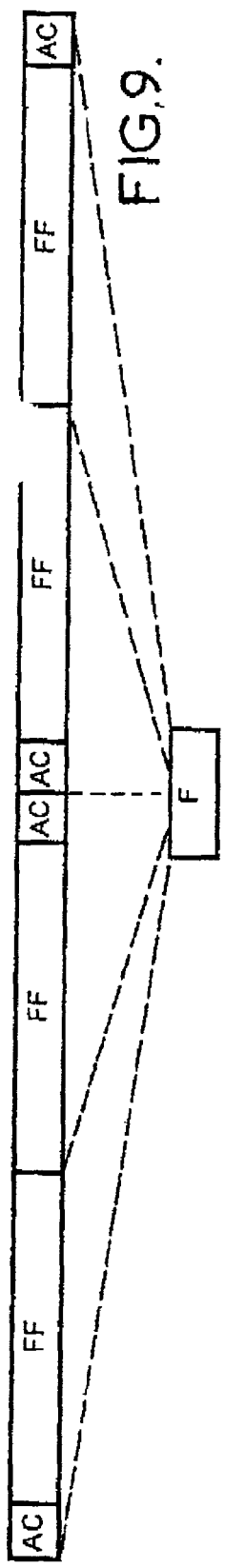
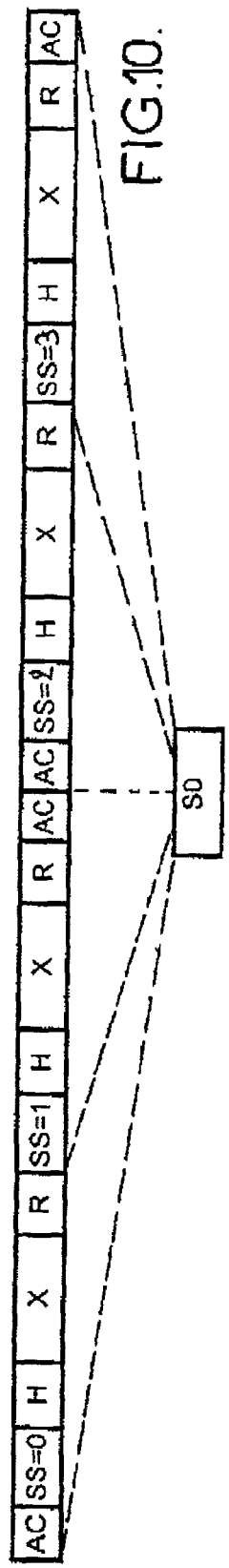
FIG.8. FIG.9. FIG.10.

RADIO COMMUNICATION METHOD BETWEEN A BASE STATION AND MOBILE TERMINALS

TECHNICAL FIELD

The present invention relates to the field of digital radiocommunications between base stations and mobile terminals, using frequency duplexing of logical traffic channels.

It is aimed especially at applications in professional radiocommunications.

BACKGROUND OF THE INVENTION

In a radiotelephony system, the mobile terminals must be capable of receiving signaling while a call is set up on a traffic channel, so as to exchange information relating to the services offered to the terminals or to the management of the radio links.

In frequency-duplexing cellular systems such as GSM, signaling channels called SACCH are associated with the traffic channels. They use the same carrier frequencies as the traffic channels, via a time-division multiplexing mechanism. These signaling channels, like their associated traffic channels, are in full duplex mode.

This is not well suited to the needs of professional radio-communication systems, which frequently operate in alternate mode, and for which the group communications play a very important role. In such a system, a known solution consists in making provision for a pair of control frequencies which are common to all the terminals attended to by a base station, and over to which the communicating mobile terminals periodically transfer for the needs of the associated signaling channels. This solution is not very flexible. Furthermore, it demands synchronism between the traffic frames and the control frames, this having the drawback of prohibiting the monitoring and presynchronization mechanisms which allow better management of radio resources, in particular through the effective implementation of intercell handovers.

Patent Application EP-A-0 896 443 describes a system of radiocommunication with mobile terminals exhibiting the feature of offering time-division multiplexing services with various degrees of protection related to the possible use of modulation coded on the carrier. For a given throughput, offered for the execution of the service, the number of timeslots allotted to the service is related to the coding or to the absence of coding of the modulation, and/or to the rate of the coding applied. In a particular execution of this system, one and the same service can be offered in a first mode on a half-channel with noncoded modulation, or in a second mode on a full channel with modulation coded by a code of rate ½.

Patent application EP-A-0 677 930 describes a frequency-division multiplexing radiocommunication system in which a carrier frequency supports a radio signal organized as multi-frames comprising traffic frames and signaling frames, uplink or downlink, reserved for the mobile stations in the transmission mode.

Patent Application EP-A-0 644 702 describes a time-division multiplexing radiocommunication system in which time intervals of frames shifted between the uplink and the downlink support logical signaling channels, uplink or downlink, for mobile stations in the transmission mode or reception mode.

The aim of the present invention is to propose an organization of associated signaling channels which properly meets the needs of professional radiocommunication systems.

SUMMARY OF THE INVENTION

The invention thus proposes a method of transmitting radio signals between a base station and mobile terminals, on a first frequency for signals transmitted from the base station to at least one of the mobile terminals and on a second frequency for signals transmitted from at least one of the mobile terminals to the base station, the transmissions on the first and second frequencies being performed according to a frame structure comprising timeslots of like duration. The first frequency carries a downlink logical traffic channel to at least one of the mobile terminals, while the second frequency carries an uplink logical traffic channel from one of the mobile terminals. The first frequency furthermore carries a first downlink logical signaling channel to one of the mobile terminals in the transmission phase on the uplink logical traffic channel, and a second downlink logical signaling channel to at least one of the mobile terminals in the reception phase on the downlink logical traffic channel. The second frequency furthermore carries a first uplink logical signaling channel from at least one of the mobile terminals in the reception phase on the downlink logical traffic channel and a second uplink logical signaling channel from one of the mobile terminals in the transmission phase on the uplink logical traffic channel. The first downlink and uplink logical signaling channels are each carried by a first timeslot of the frame structure, while the second downlink and uplink logical signaling channels each occupy a second timeslot of the frame structure, distinct from said first slot.

In a particular embodiment of the method, the frame structure comprises timeslots dedicated to the logical traffic channels, at least one timeslot dedicated to the logical signaling channels and at least one timeslot forming for the mobile terminals a window for listening to signals transmitted from other base stations.

Preferably, the frame structure comprises a programmable timeslot scheduled for the transmission on at least the first uplink logical signaling channel, the base station transmitting, in the course of the timeslots dedicated to the logical traffic channels, signals for controlling access to said programmable timeslot by the mobile terminals in the reception phase. It is thus possible to adjust according to needs the throughput of the downlink and uplink control channels between the base station and the terminals in the reception phase on the traffic channel. Said access control signals may comprise signals for authorizing the mobile terminals in the reception phase to transmit in the course of a next programmable timeslot, and signals for apprising of the processing of requests made by the mobile terminals in the reception phase in the course of a previous programmable timeslot.

When the logical traffic channels are used in alternate mode, with successive alternations in the course of which only one of the mobile terminals is in the transmission phase on the uplink logical traffic channel while one or more of the mobile terminals are in the reception phase on the downlink logical traffic channel, it is possible for the base station to transmit access control signals in such a way as to restrict the transmissions of the mobile terminals in the course of the programmable timeslots in an initial period of an alternation with respect to the rest of the alternation.

Another aspect of the present invention relates to a radio-communication base station, comprising means for transmitting and for receiving radio signals having the above structure as regards the associated logical traffic and signaling channels.

A third aspect of the present invention relates to a radio-communication mobile terminal, comprising means for transmitting and receiving radio signals, having the above structure as regards the associated logical traffic and signaling channels.

BRIEF DESCRIPTION OF THE DRAWINGS

FIG. 3 is a chart illustrating the frame structure transmitted on physical control channels formed in one exemplary embodiment of the invention;

FIGS. 6 and 7 are charts detailing the respective structures of two timeslots of the frame of FIG. 3;

FIG. 8 is a chart illustrating an alternative frame structure transmitted on physical control channels;

FIGS. 9 and 10 are charts detailing the respective structures of two timeslots of the frame of FIG. 8.

DESCRIPTION OF PREFERRED EMBODIMENTS

Figure 1:
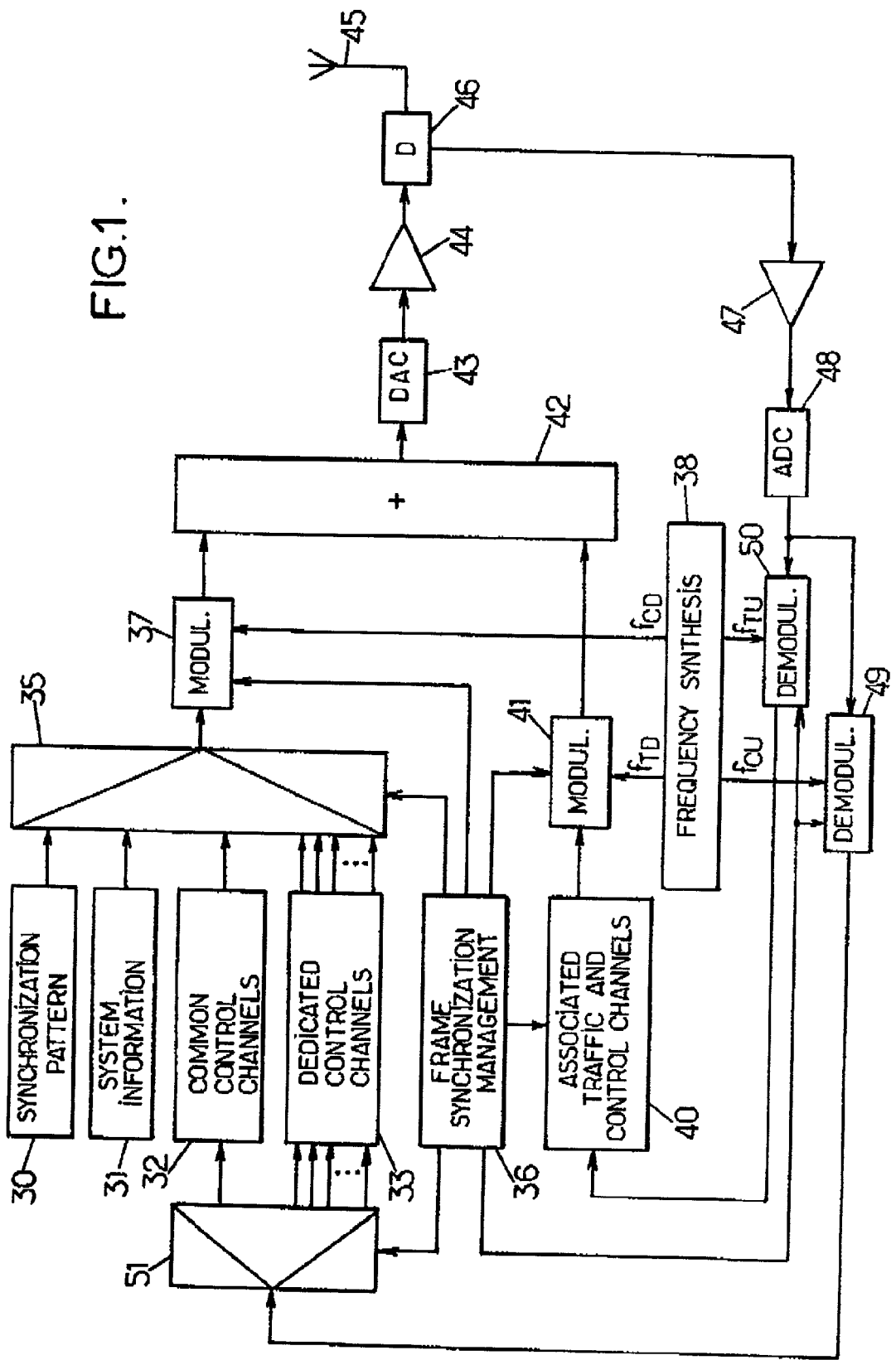
FIG. 1 is a schematic diagram of an exemplary base station according to the invention.
Figure 2:
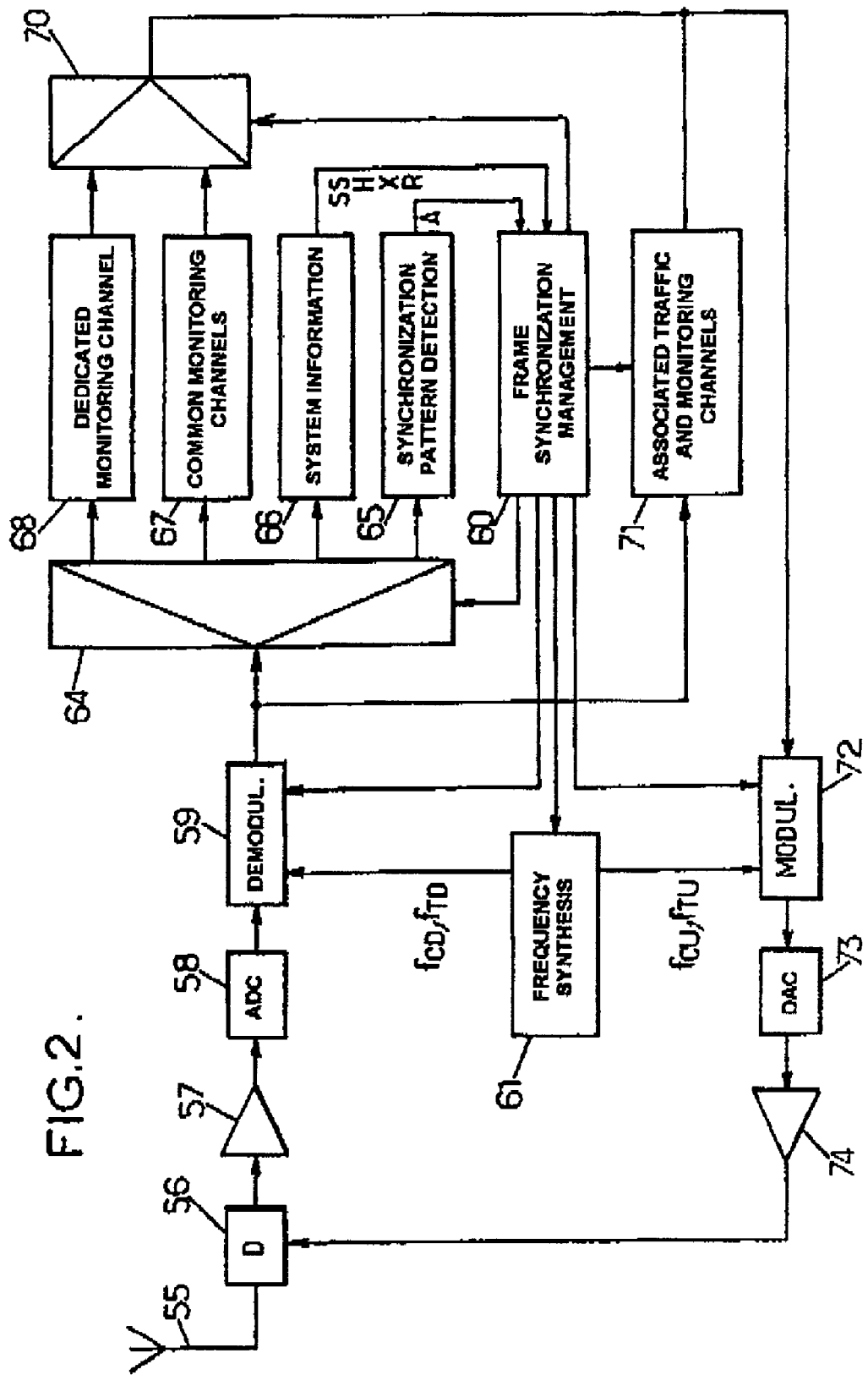
FIG. 2 is a schematic diagram of an exemplary mobile terminal according to the invention.

In the embodiment described here by way of example, the base station and the mobile terminal represented in FIGS. 1 and 2 belong to a professional radiocommunication system operating in frequency division multiple access mode (FDMA). It is assumed, by way of illustration, that this system implements the method of defining channels described in the aforesaid patent application EP-A-0 896 443, using for one and the same service either a full channel with modulation coded by a code of rate 1/K (mode 2), or a fractional channel of K times smaller throughput with a no-coded modulation (mode 1), with K=2. One then takes into consideration elementary timeslots, whose duration $d_1$ is for example 20 ms, used in mode 1, and composite timeslots, whose duration $d_2=K.d_1$ is in this example 40 ms, used in mode 2.

For each base station there is defined, on a particular frequency $f_{CD}$, a downlink physical channel devoted to the transmission of control information. Symmetrically, an uplink physical channel is defined on a frequency $f_{CU}$ for transmitting control information from the mobile terminals to the base station. These physical control channels are subdivided into logical control channels by time-division multiplexing. Some of these logical channels are common channels shared by the mobile terminals within range of the base station. Others are dedicated channels, which the base station uses to communicate with particular mobiles.

The signal transmitted on each of the physical control channels takes the form of successive frames subdivided into K.M elementary timeslots belonging to different logical channels. In the example illustrated by FIG. 3, where M=13, the elementary slots denoted F, S0 and P relate to common downlink channels, and those denoted Si (with $1 \leq i \leq 11$) relate to bidirectional dedicated channels.

The slots F have a duration $d_1'$ and are repeated every K'.M elementary timeslots, with $d_1'=d_1$ and K'=K=2 in the example of FIG. 3. They contain a synchronization pattern formed by a predetermined sequence of bits making it possible to carry out the frequency- and time-synchronization of the mobile terminals.

The slots S0 have a duration $d_1'$ and are repeated every K'.M elementary timeslots. They contain system information required for coordination between the mobiles and the base station, comprising for example: (i) a field H of 5 bits tagging the position of the timeslot S0 in the current superframe (a superframe represents the smallest common multiple between the periodicity of the traffic channels and that of the control channels, i.e. 13×27 composite timeslots in the example considered, i.e. 14.04 s); (ii) a field X of 3 bits tagging the position of the timeslot S0 in a longer period (hyperframe), such as a period of encryption of the air interface (typically of the order of an hour); and (iii) a field R of 3 bits indicating the minimum field strength received for access to the cell (for example quantized in steps of 5 dB).

The slots P are used by the base station for addressing messages to mobile terminals with which it is not currently communicating (paging). In the uplink direction, the elementary timeslots left blank in FIG. 3, or those denoted Si ($1 \leq i \leq 11$) which are not allotted as dedicated channels, can be used by the mobile terminals to perform random access (common uplink channel).

The slots Si ($1 \leq i \leq 11$) of the dedicated channels are used after an allocation procedure. They each arise twice per frame in the example considered. The control frame being 520 ms long, a timeslot Si, for given i, occurs on average every 260 ms, with a duration of 100 ms between the transmitting of a message by the base station over a downlink slot Si and the transmitting of the response by the mobile terminal over the next uplink slot Si, and a duration of 140 ms or 180 ms between the transmitting of a message by the mobile terminal over an uplink slot Si and the transmitting of the response by the base station over the next downlink slot Si.

The base station can furthermore set up traffic channels with one or more mobile terminals situated within its range, after a setup procedure performed by means of a dedicated control channel Si. The traffic channel set up with a terminal is downlink (frequency $f_{TD}$) and/or uplink (frequency $f_{TU}$) The traffic channel is multiplexed on the frequency $f_{TD}$ and/or $f_{TU}$ with associated signaling channels serving to exchange signaling during communication (for example measurements or commands for controlling the radio power transmitted by the mobiles, call signaling, requests and commands for changing cell, pre-empting alternate operation, etc.).

Figure 4:
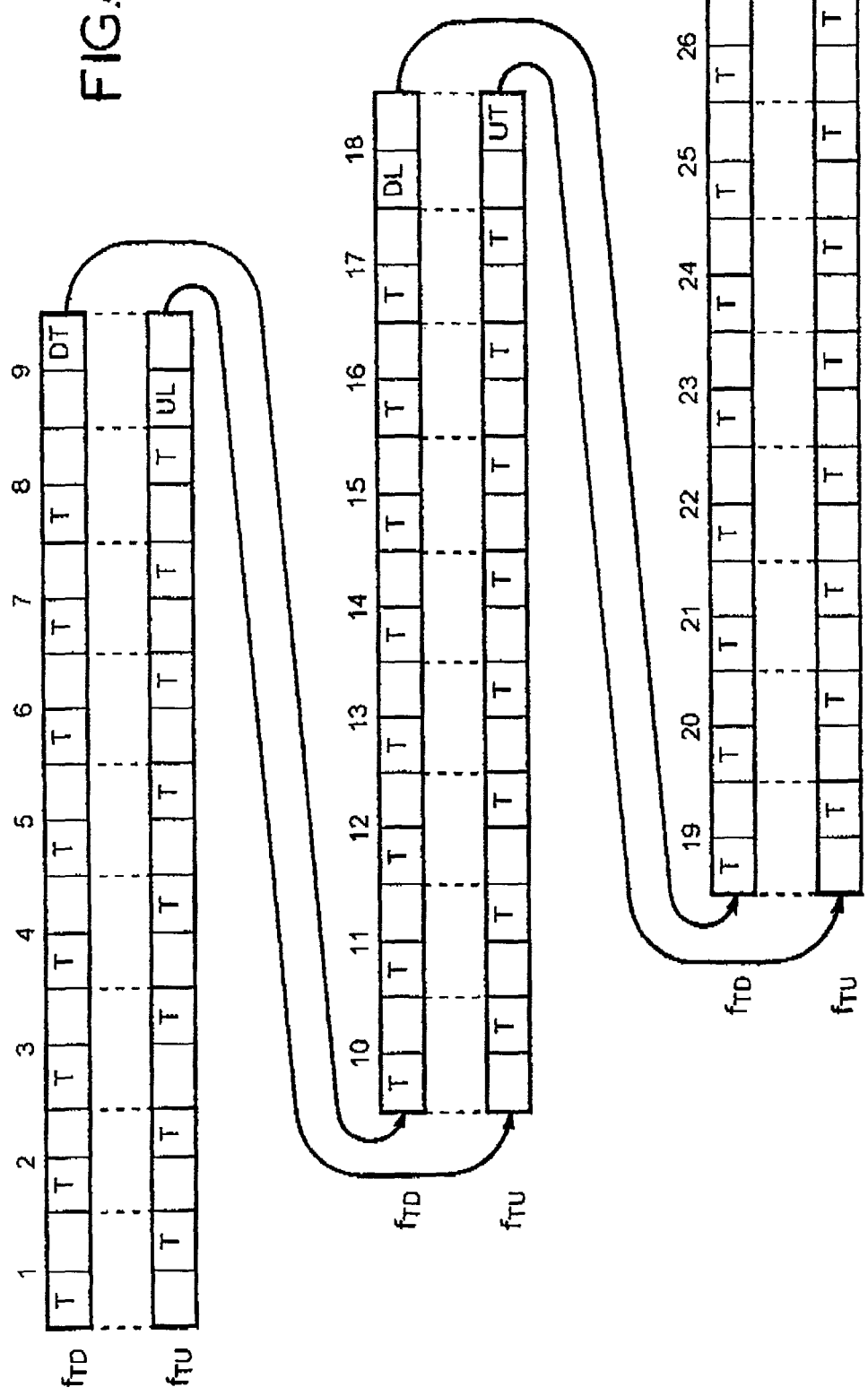
FIGS. 4 and 5 are charts respectively illustrating two frame structures transmitted on traffic channels formed in an exemplary embodiment of the invention.
Figure 5:
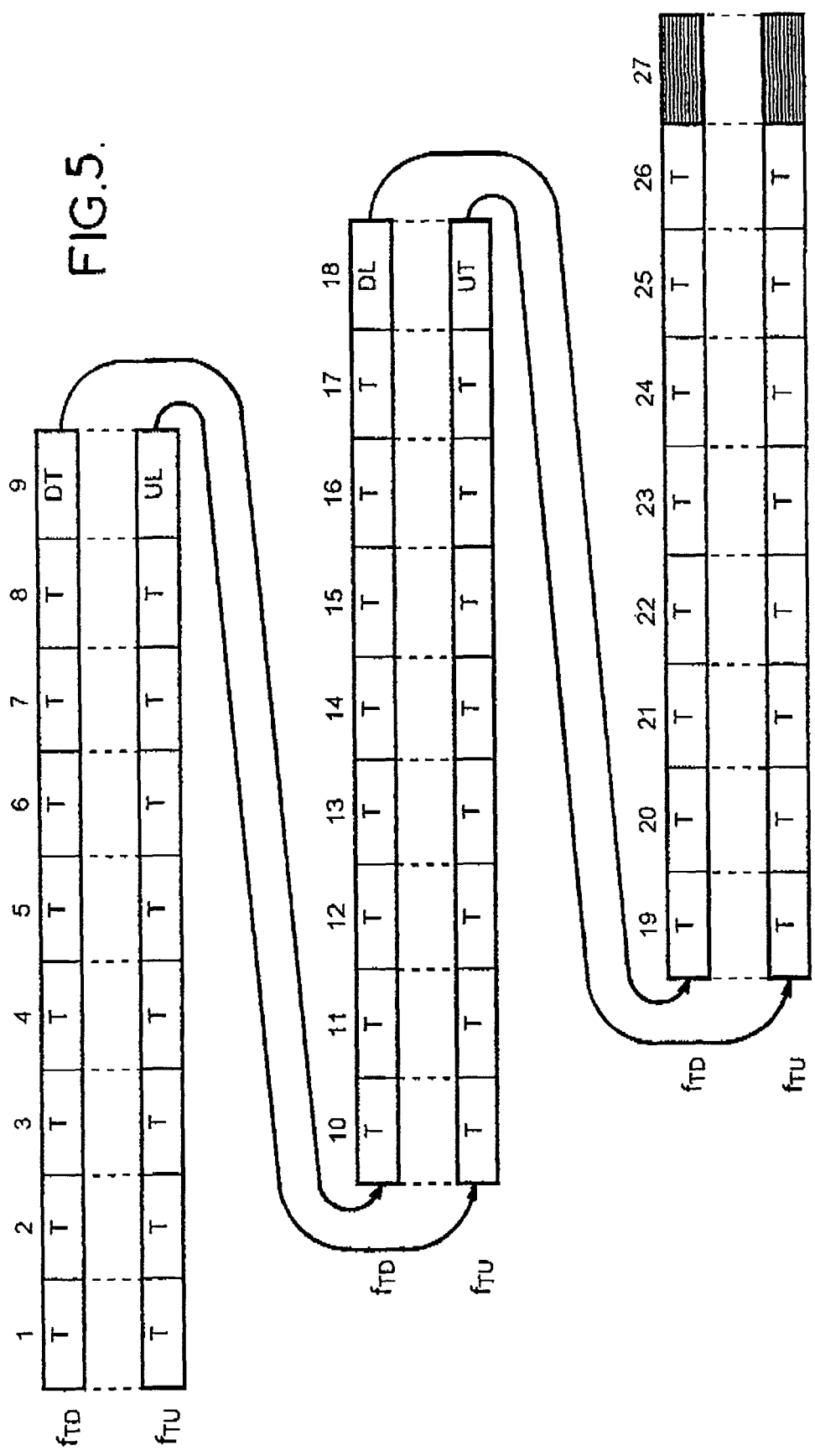

The uplink and downlink traffic channels may have the frame structure represented in FIG. 4 corresponding to mode 1, or that represented in FIG. 5 corresponding to mode 2. Each frame of the traffic channel has a duration corresponding to K.Q=54 elementary timeslots (Q=27), and is divided into three parts of 18 elementary slots. In each of these three parts, the first eight composite timeslots are occupied by the logical traffic channel. The ninth composite timeslot is occupied by associated control channels for the first two parts, and unoccupied for the third part. This unoccupied slot, hatched in FIGS. 4 and 5, constitutes a monitoring window during which the mobile terminal changes frequency so as to observe the physical control channels of the base stations of the neighboring cells, so as to be able to perform a change of cell if necessary.

In mode 1 illustrated by FIG. 4, each of the first eight composite timeslots of each third of the frame comprises an odd elementary slot for the downlink direction and an even elementary slot for the uplink direction, tagged by the letter T in the figure. Consequently, on the same downlink carrier $f_{TD}$, the base station can multiplex a logical traffic channel set up with another mobile terminal. Furthermore, if the mobile terminal is capable of passing from frequency $f_{TD}$ to frequency $f_{TU}$ and vice versa in the short timespan separating two elementary slots, mode 1 makes it possible to set up the communication in time-duplex mode.

In mode 2 illustrated by FIG. 5, the composite timeslots of the frames transmitted on the traffic channels are not subdivided into two elementary slots. The signal, transmitted with the same information throughput, is subjected to a modulation coded with a rate of 1/K=½ as set forth in patent application EP-A-0 896 443, thereby achieving better sensitivity for the receiver. With this mode of operation, the time duplex described earlier cannot be used. In the general case where the mobile terminals are not capable of modulating and of demodulating simultaneously about two different carrier frequencies, this mode of operation necessitates a communication discipline of alternate operation type.

Within the monitoring window of a traffic frame, the mobile terminal attempts to detect the synchronization pattern transmitted in the timeslot F of the control frame by the base station of a neighboring cell. It therefore demodulates the signal received according to the frequency $f_{CD}$ used in this neighboring cell. If the synchronization pattern is detected, the terminal uses the same frequency $f_{CD}$ in the monitoring window of a following frame, and attempts to extract the system information transmitted by the same base station in its slot S0. If this information is properly received, the mobile terminal is ready to change cell if necessary.

The monitoring window has a duration $d_2$ corresponding to a composite timeslot, i.e. K=2 elementary slots. In order to be certain that in the course of a superframe, these windows cover the timeslots F and S0 of the downlink control frames of the neighboring cells, it is judicious for the periodicity of these time windows, and that of the timeslots F and S0 on the physical control channel, expressed as a number of composite timeslots, to be mutually prime. Stated otherwise, the periodicity of the monitoring windows being Q composite slots, and that of the timeslots F and S0 being M composite slots, the numbers M and Q are chosen to be mutually prime, this being the case in the embodiment described where M=13 and Q=27. The mobile terminal then monitors the various possible frequencies $f_{CD}$ at the superframe rate, until the synchronization pattern transmitted in a neighboring cell is detected.

Furthermore, the timeslot S0 occurring p composite slots after the timeslot F on the carrier $f_{CD}$, with p<M (p=1 in the example of FIG. 3), it is judicious to choose the integer Q of the form q.M+p, with q integer. This condition is fulfilled in the example described where p=1, q=2, M=13 and Q=27. Hence, when the mobile terminal picks up the synchronization pattern transmitted by a cell in a monitoring window, it can pick up the system information transmitted by this same cell right from the next monitoring window, thereby minimizing the duration of the acquisition process.

In FIG. 1, block 30 denotes the source of the synchronization pattern transmitted in the slots F, and block 31 the source of the system information transmitted in the slots S0. Block 32 diagrammatically depicts the circuits serving to process the information exchanged on the other common control channels, in particular paging and random access channels. The block 33 diagrammatically depicts the circuits devoted to the processing and exchanging of information on the dedicated control channels S1-S11 set up with various mobile terminals in the cell. A multiplexer 35 receives the signals delivered by blocks 30 to 33 and constructs the downlink frames represented in the upper part of FIG. 3 under the control of a module 36 for synchronizing and managing the frames. The output stream from the multiplexer 35 is provided to a modulator 37 which carries out the modulation about the carrier frequency $f_{CD}$ output by the frequency synthesis module 38.

For reception on the control channel, the base station comprises a demodulator 49 which demodulates the signal received in relation to the carrier frequency $f_{CU}$ provided by the module 38, and delivers to the demultiplexer 51 the downlink binary frames having the structure represented in the lower part of FIG. 3. Under the control of the module 36 for synchronizing and managing the frames, the demultiplexer 51 extracts the information relevant to the common control channels 32 and the dedicated control channels 33.

In addition to the physical control channel, the base station can set up a certain number of traffic channels with mobile terminals situated within its range. In the simplified example represented in FIG. 1, the base station is regarded as using a single traffic frequency $f_{TD}$ in the downlink direction and a single traffic frequency $f_{TU}$ in the uplink direction, the block 40 designating the circuits, supervised by the module 36, serving for the processing and exchanges on these traffic channels and on the associated control channels.

A modulator 41 modulates the digital signal produced by the block 40, which has the structure represented in the upper part of FIG. 4 or 5, about the carrier frequency $f_{TD}$ delivered by the frequency synthesis module 38. The frequency $f_{TU}$ of the uplink traffic channel is received from the synthesis module 38 by a demodulator 50. The resulting digital signal, which has the structure represented in the lower part of FIG. 4 or 5, is addressed to the processing circuits 40 of the traffic channel.

When a traffic channel has been allotted, the frame synchronization and management module 36 instructs the modulator 41 and the demodulator 50 to activate the coding of the modulation and the deployment of the corresponding demodulation scheme only if mode 2 is required (FIG. 5).

In practice, to ensure multiple access, the base station will comprise several modulators 41 and several demodulators 50 operating according to the various traffic frequencies.

The radio signals delivered by the modulators 37 and 41 are combined by the summator 42. The resulting signal is converted into analog at 43, then amplified at 44 before being transmitted by the antenna 45 of the base station. A duplexer 46 extracts the radio signal picked up by the antenna 45 of the base station, and supplies it to an amplifier 47. After digitization 48, the signal, received and amplified, is supplied to the demodulators 49 and 50.

A mobile terminal communicating with the above base station can comply with the schematic diagram of FIG. 2. The antenna 55 is linked to a duplexer 56 so as to separate the signals transmitted and received. The signal received is amplified at 57, then digitized at 58 before being addressed to the demodulator 59. The mobile terminal comprises a frame synchronization and management module 60, which controls the frequency synthesis module 61 so that it provides the demodulator 59 either with the frequency $f_{CD}$ of a physical control channel, or the frequency $f_{TD}$ of a downlink traffic channel allotted to the terminal.

When the demodulator 59 operates at the frequency $f_{CD}$, the digital signal frames, which may have the structure represented in the upper part of FIG. 3 are addressed to a demultiplexer 64 controlled by the synchronization module 60 so as to distribute the signals pertaining to the various logical channels to blocks 65, 66, 67, 68 which designate the circuits respectively used to detect the synchronization patterns on the logical channel F, to extract the system information from the logical channel S0, to process the common control channels and to process the dedicated control channel Si optionally allotted to the terminal. The frame synchronization and management module 60 also controls a multiplexer 70 which forms the contribution of the terminal to the uplink frames at the frequency $f_{CU}$ (lower part of FIG. 3).

When a traffic channel is allotted, the demodulator 59 operates at the frequency $f_{TD}$ (except in the monitoring windows), and its output signal is addressed to the circuits 71 which process the traffic channel and the associated control channels (reception of the channels DT, DL of FIGS. 4 and 5). These circuits 71 furthermore deliver the stream to be transmitted on the frequency $f_{TU}$, represented in FIG. 4 or 5 (traffic channel and associated channels UL, UT).

The modulator 72 of the mobile terminal, controlled by the module 60, receives either the stream delivered by the multiplexer 70 and the frequency $f_{CU}$ for transmission on the physical control channel, or the stream delivered by the circuits 71 and the frequency $f_{TU}$ for transmission on the traffic channel. The radio signal output by the modulator 72 is converted into analog at 73, into amplified at 74 before being transmitted by the antenna 55.

When a traffic channel has been allotted, the frame synchronization and management module 60 instructs the modulator 72 and the demodulator 59 to activate the coding of the modulation and the deployment of the corresponding demodulation scheme only if mode 2 is required (FIG. 5).

In the monitoring windows, the frame synchronization and management module 60 of the terminal indicates to the frequency synthesis module 61 the frequency $f_{CD}$ to be supplied to the demodulator 59, distinct from the frequency $f_{CD}$ of the serving base station. It furthermore instructs the demultiplexer 64 in such a way that the demodulated signal is addressed to block 65 for detecting the synchronization pattern. If the synchronization pattern is not detected, the module 60 repeats the same process in the course of the next monitoring window, until the same frequency $f_{CD}$ has been monitored M times. When the synchronization pattern is detected in a monitoring window (data A in FIG. 2), the module 60 causes the same frequency $f_{CD}$ to be maintained in the next window, and it instructs the demultiplexer 64 so that the demodulated signal is addressed to block 66 for extracting the system information.

A mobile terminal compatible with the mode of operation of FIG. 4, with the time duplex, must have a frequency synthesis module 60 capable of providing two different frequencies $f_{TD}$, $f_{TU}$ at instants which are very close to the boundaries between the elementary timeslots. In practice, this requires the module 60 to comprise two distinct frequency synthesizers, this having a significant impact on the cost of the terminal.

A simplified version of the terminal does not allow alternation between the frequencies $f_{TD}$ and $f_{TU}$ between the elementary timeslots. This simplified terminal operates under alternate mode only, since the relative slowness of frequency switching poses no problem at the moment of the alternations.

However, in the monitoring window of each frame, the synthesis module 60 must be capable of switching its frequency so as to examine the physical control channels of the neighboring cells. When the timeslot F of a neighboring cell falls within the monitoring window of the mobile terminal tuned to the frequency of the control channel of this neighboring cell, the terminal is at risk of failing to detect the synchronization pattern by reason of its relative slowness of frequency switching and/or of the absence of synchronization between the cells.

To avoid this, the elementary timeslot F is subdivided into N subslots of like duration in the course of which the synchronization pattern FF is transmitted repeatedly. These subslots are here called "presynchronization slots". By way of example, it is possible to take N=4, the duration of the presynchronization slots being $d_1'/N=5$ ms (see figure 6). It will then be possible to detect the synchronization pattern FF even if the mobile terminal lacks the demodulation of the start of timeslot F.

The synchronization which can thus be achieved is incomplete in the sense that there is no regard as to which of the N occurrences of the synchronization pattern has been detected. Nevertheless, this incomplete synchronization makes it possible to lock the frequency of the synthesis module 61 of the terminal and to position the mobile terminal on the structure of the control frames of the neighboring cell, with an offset of $k.d_1'/N$, where k is an unknown integer lying between 0 and N−1. Returning to the same monitoring frequency $f_{CD}$ with a delay of Q composite timeslots with respect to the instant of the start of the detected synchronization pattern, the monitoring window of the next frame will make is possible to pick up part at least of the timeslot S0 containing the system information.

The base station also subdivides this elementary timeslot S0 into N subslots of like duration $d_1'/N$ each containing, in addition to the aforesaid fields H, X and R, a field SS of n bits, where n is the integer equal to or immediately greater than $\log_2 N$ (n=2 in the example considered). These n bits contain the serial number of the subslot in the timeslot S0, i.e. SS=0, 1, . . . , N−1 (FIG. 7). The fields H, X and R contain the same values in the various subslots of the same slot S0. These N subslots of the slot S0 are here called "synchronization supplement slots".

A fixed offset of $d_2$ occurs between each presynchronization slot and a synchronization supplement slot associated therewith.

Block 66 of the mobile terminal extracts the system information (fields H, X, R) in one of their occurrences, temporally located with respect to the occurrence of the previously detected synchronization pattern. Furthermore it obtains the serial number SS of this occurrence, and supplies it to the frame synchronization and management module 60 together with the content of the fields H, X and R. This serial number SS allows the module 60 to determine the aforesaid integer k and to resolve the uncertainty which had existed in the time synchronization performed solely on the basis of detecting the synchronization pattern FF. Having thus completed the synchronization, the mobile terminal is ready to change cell should this be necessary.

Considering for example that the terminal needs 5 ms to change its frequency, the monitoring window of duration $d_2=40$ ms is truncated by 5 ms at the start and at the end. Given that, in the example of FIG. 3, the sought-after synchronization pattern FF lies in an slot F of $d_1'=20$ ms modulo a periodicity which is a multiple of 40 ms without synchronism with respect to the frame rate to which the terminal is tuned, the duration of the presynchronization slot containing this pattern FF is at most 5 ms if we wish to guarantee its detection. This justifies the choice N=4 in the case considered.

If the cells were synchronized, only the switching time needing to be taken into account, the duration of the presynchronization slot could be as much as 10 ms (N=2). However, this type of synchronization is not usually employed since it poses network architecture problems.

By making provision for the pattern FF to be present in all the subslots of the slot F as represented in FIG. 6, its probability of detection is maximized. However, it should be noted that, in the example of FIG. 3, only the first and the last subslots of 5 ms of the slot F could play the role of presynchronization slots containing the synchronization pattern FF, the other two subslots possibly containing something else. This suffices to ensure that the pattern FF can be detected by the mobile terminals. Under these conditions, only the first and the last subslots of the slot S0 could, similarly, play the role of synchronization supplement slots containing the system information. One bit is then sufficient in the synchronization supplement slots to identify what it involves and to make it possible to complete the synchronization.

Alternatively, the duration $d_1'$ of the timeslots F and S0 is 40 ms, their rate of repetition being the same as before, namely $M \times d_2 = 520$ ms. Stated otherwise, $K' = d_2/d_1' = 1$. For example, in certain embodiments, the timeslots F, P and Si ($i \geq 0$) are not apportioned into two on the physical control channels (carriers $f_{CD}$ and $f_{CU}$), i.e. there is no time-division multiplexing of order 2 on these carriers. The control channels can also have a structure as depicted diagrammatically in FIG. 8, this being similar to that represented in FIG. 3 with the following differences:

the timeslots F and S0 are $d_1' = d_2 = 40$ ms, while the slots Si with $1 \leq i \leq 11$ remain of $d_1 = 20$ ms;

the logical channel formed by the slots denoted S6 has a throughput reduced by a half.

The timeslots F and S0 of 40 ms may then be subdivided into N=4 subslots of 10 ms, thereby ensuring the detection of the pattern FF with a frequency switching time of 5 ms for the mobile terminals, without synchronism between the cells.

This makes it possible to transmit more information in the logical channel S0. In particular, the field X can be lengthened so as to allow longer periods of encryption (for example 24 to 48 hours), or the indication of an encryption key index or of an encryption algorithm to be used.

It may be observed that only the subslots of 10 ms of ranks 1 and 3 (or 2 and 4) of the slots F and S0 could in this case be presynchronization and synchronization supplement slots carrying respectively the pattern FF and the system information, the other two subslots possibly containing something else.

FIGS. 9 and 10 illustrate a possible structure of the slots F and S0 of 40 ms, subdivided into N=4 subslots of 10 ms. In this example, where the synchronization pattern FF is 9.5 ms, each subslot of the slot F or S0 includes a 0.5 ms slot devoted to an access control (AC) logical channel. The first and the third subslots of the slot F are presynchronization slots commencing with the 0.5 ms slot of the AC channel, followed by the pattern FF, while the second and the fourth subslots of the slot F are presynchronization slots commencing with the pattern FF followed by the 0.5 ms slot of the AC channel. Likewise, the first and the third synchronization supplement subslots commence with the 0.5 ms slot of the channel AC, followed by the fields SS=0 or 2, H, X, R which occupy 9.5 ms, while the second and the fourth synchronization supplement subslots commence with the fields SS=1 or 3, H, X, R followed by the 0.5 ms slot of the AC channel.

The other timeslots (P, Si with $1 \leq i \leq 11$) of the physical control channel on the frequency $f_{CD}$, which are of $d_1 = 20$ ms (FIG. 8), each comprise two 0.5 ms slots devoted to the AC channel, one situated at the start and the other at the end of the slot. They are therefore disposed in the same way as in the two halves of the slots F and S0. In each of these slots P, Si, the useful data, if any, occupy for example a central span of 17.5 ms flanked by two synchronization words of 0.75 ms (which allow the terminals to track synchronization with their serving cell) and by the two 0.5 ms AC slots. The four 0.5 ms slots of the channel AC which lie in a 20 ms slot of rank n of the downlink control channel carry four bits $X_1$, $X_2$, $Y_1$ and $Y_2$, protected by a code of rate ½, the significance of which is for example as follows:

$X_1 X_2 = 00$: the 20 ms slot of rank n+j of the uplink physical control channel $f_{CU}$ is unavailable for random access by the mobile terminals (because it is occupied by an allotted dedicated channel Si);

$X_1 X_2 = 01$: the 20 ms slot of rank n+j of the uplink channel $f_{CU}$ is available for random access in normal mode;

$X_1 X_2 = 10$: the 20 ms slot of rank n+j of the uplink channel $f_{CU}$ is available for random access in protected mode (which are processed differently from those in normal mode);

$X_1 X_2 = 11$: reserved;

$Y_1 = Y_2 = 00$: the base station indicates that it has detected and correctly processed a random access performed by a mobile terminal during the 20 ms slot of rank n−j' of the uplink channel $f_{CU}$;

$Y_1 Y_2 = 01$: the base station indicates that it has detected a random access performed during the 20 ms slot of rank n−j' of the uplink channel $f_{CU}$, without having been able to properly conclude the processing of this random access, for a reason likely to be distinct from a problem of collision between two concurring random accesses;

$Y_1 Y_2 = 10$: the base station indicates that it has detected a random access performed during the 20 ms slot of rank n−j' of the uplink channel $f_{CU}$, without having been able to properly conclude the processing of this random access, likely on account of a collision between two concurring random accesses (the mobile terminals follow a separate repetition protocol depending on whether or not there has been a collision);

$Y_1 Y_2 = 11$: reserved.

The positive numbers j and j' are for example equal to 3 or 4.

Figure 11:
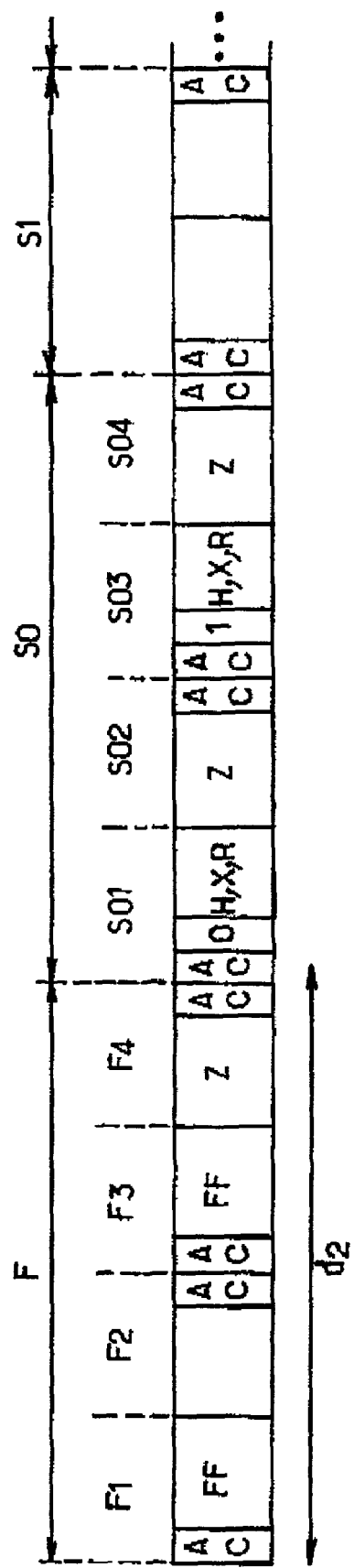
FIG. 11 is a chart illustrating another alternative frame structure transmitted on physical control channels.

In the example illustrated by FIG. 11, the timeslot F, of $d_2 = 40$ ms, is subdivided into N=4 subslots F1, F2, F3, F4 and the timeslot S0 is subdivided into N=4 corresponding subslots S01, S02, S03, S04. As in the case of FIGS. 9 and 10, the subslots of odd ranks F1, F3, S01, S03 commence with 0.5 ms devoted to the access control (AC) channel, and the subslots of even ranks F2, F4, S02, S04 terminate with 0.5 ms devoted to the AC channel. The subslots of odd rank F1, F3 are the presynchronization slots carrying the synchronization pattern FF, and the subslots of odd rank S01, S03 are the synchronization supplement slots carrying the system information H, X, R and a bit at 0 to designate the subslot S01 and at 1 to designate the subslot S03. This bit makes it possible to resolve the synchronization ambiguity resulting from the detecting of the pattern FF alone. Each of the synchronization supplement slots S01, S03 is preceded and followed by a subslot of $d_2/N = 10$ ms containing additional system information denoted Z. This information Z is therefore included by the base station in the subslots F4, S02 and S04 since the composite slots F and S0 follow one another in this example (p=1).

This procedure can be generalized to the case where $N \geq 4$. It relies on the observation that a mobile terminal, even a simplified one, always picks up at least two consecutive 10 ms periods in its monitoring window. A mobile terminal which has picked up the pattern FF in the first half of a monitoring window can then recover the additional information Z in the second half of the next monitoring window (subslot S02 or S04), after it has received the system information in the subslot S01 or S03. Also, a mobile terminal which has picked up the pattern FF in the second half of a monitoring window can recover the additional information Z in the first half of the next monitoring window (subslot F4 or S02), before it has received the system information in the subslot S01 or S03.

Thus, increased throughput is available in the guise of the control channel formed by the slots S0.

Returning to FIGS. 4 and 5, detailed hereinbelow is the structure of the signaling channels associated with the traffic channels and sharing the same carrier frequencies.

When the base station is currently listening to whatever the mobile terminal is transmitting on the carrier $f_{TU}$, it has available a timeslot belonging to an associated logical signaling channel denoted DT ("downlink talker") at the end of the first third of each frame on the carrier $f_{TD}$. The DT channel carries downlink signaling which may in particular pertain to control of transmission power by the mobile terminal (power measurements made by the base station and allowing the terminal in a transmission phase to regulate its power so as to limit the interference in the whole network), to indications of communications relating to the terminal in a transmission phase, or else to commands to cease transmission (for example should the traffic channel be pre-empted by a terminal of higher priority).

When the base station is currently transmitting to a mobile terminal on the carrier $f_{TD}$, it has available a timeslot belonging to an associated logical signaling channel denoted DL ("downlink listener") at the end of the second third of each frame on the carrier $f_{TD}$. The DL channel carries downlink signaling which may in particular pertain to identification (color codes) of the neighboring cells in which the group communication is set up (allowing the terminals in a reception phase to choose a new cell if the conditions of reception deteriorate), to indications of communications relating to the terminal in a transmission phase, or else to transmission of the talker identity or of parameters serving for decrypting the signals transmitted on the traffic channel.

When the mobile terminal is currently listening to whatever the base station is transmitting on the carrier $f_{TD}$, it has available a timeslot belonging to an associated logical signaling channel denoted UL ("uplink listener") at the end of the first third of each frame on the carrier $f_{TU}$. The UL channel carries uplink signaling which can in particular pertain to random access from the terminal asking for the alternate operation entitlement, or else to responses to requests made by the base station (on the logical channel DL) for ascertaining the presence of the terminals.

When the mobile terminal is currently transmitting to a base station on the carrier $f_{TU}$, it has available a timeslot belonging to an associated logical signaling channel denoted UT ("uplink talker") at the end of the second part of each frame at the frequency $f_{TU}$. The UT channel carries uplink signaling which can in particular pertain to change of cell requests if the terminal notes a deterioration in the radio conditions according to the measurements dispatched by the base station on the logical DT channel or those made by the terminal, or else a change of type of transmission request (for example from voice to data).

Of course, the various signaling elements exchanged on the channels DT, DL, UL and UT are not limited to those cited above by way of example.

The timeslots belonging to the associated channels DT, DL, UL, UT are elementary slots in mode 1 (FIG. 4), and composite slots in mode 2 (FIG. 5).

As shown by FIG. 4, the elementary slots pertaining to the logical channels DT and UL are permuted within their composite slot in mode 1. The elementary slots appertaining to the logical channels DT and UL are respectively even and odd, i.e. that of the uplink channel UL occurs before that of the downlink channel DT, while the reverse holds in the composite slots pertaining to the downlink and uplink traffic channels. This disposition allows the simplified terminals, for which several milliseconds are necessary in order to change frequency, to access all of the 20 ms slots DT and UL.

Of course, if the odd elementary slots are reserved for the uplink direction and the even ones for the downlink direction in the logical traffic channels, then, in order to obtain the same result, provision will be made for the odd elementary slots to be reserved for the downlink direction and the even ones for the uplink direction in the logical signaling channels DT and UL.

As far as the slots DL and UT are concerned, these requiring no change of frequency of the mobile terminals, the permuting of the elementary slots within the composite slot which contains them is optional in mode 1.

It should be noted that, in mode 1 with time duplex, there is no distinction between the DT and DL channels, nor between the UT and UL channels, since the terminal is simultaneously in the transmission phase and in the reception phase on the duplex traffic channel.

In mode 2 (FIG. 5), the slots pertaining to the associated signaling channels DT, UL, DL, UT are composite slots. The management of the channels DL and UT does not pose any particular problem since (i) they require no change of frequency of the mobile terminals, and (ii) only the transmitting mobile terminal is able to employ the channel UT.

To indicate the ninth timeslot of duration $d_2$ of a frame will be devoted to the downlink channel DT or to the uplink channel UL, the base station uses a mechanism with control bits $X_1, X_2, Y_1, Y_2$ similar to that described earlier. The base station is then transmitting on the traffic channel of the carrier $f_{TD}$, so that it can insert the bits $X_1, X_2, Y_1, Y_2$ in the timeslots of the traffic channel so as to control access to the ninth composite timeslot.

For example, the bits $X_1, X_2$ placed in the sixth timeslot of the frame (the case j=3) will indicate whether the mobiles are or are not authorized to perform random access, i.e. whether the ninth slot belongs to an uplink (UL) or downlink (DT or DL) signaling channel, and the bits $Y_1, Y_2$ placed in the twelfth timeslot of the frame (the case j'=3) will apprise of the processing of any random access performed in the previous UL slot. The coding of the control bits $X_1, X_2, Y_1, Y_2$ can be the same as before.

The ninth composite timeslot of the frame is therefore programmable by the base station. Depending on needs, it will assign it either to the uplink UL channel or to a downlink channel. It should be noted that, when it is assigned to a downlink channel, the information transmitted in this slot may relate both to the terminals in the transmission phase (DT channel) and those in the reception phase (DL channel). This holds for mode 2 as just set forth, but also for mode 1: a simplified terminal cannot switch its frequency immediately between the elementary slots denoted UL and DT in FIG. 4, so that it is useful for the base station to indicate to it whether the ninth slot will serve for the transmission of downlink signaling (on the logical DL channel borrowing the slot denoted DT) or for any transmission of uplink signaling (on the UL channel).

It is very advantageous for the base station to have the possibility of programmably increasing the overall throughput of the logical DL channel to the detriment of that of the logical UL channel. This allows good adaptation to the needs encountered in the traffic communications under alternate operation, i.e. with successive alternations in which just one of the mobile terminals is in the transmitting on the uplink logical traffic channel while one or more of the mobile terminals are receiving on the downlink logical traffic channel.

The base station can thus transmit access control bits $X_1$, $X_2$ suitable for restricting the possibilities of random access by the mobile terminals at the start of an alternation (reduction in the overall throughput of the UL channel), compared with the rest of the alternation. Indeed, there is little benefit in authorizing a new alternate operation pre-emption request only a short time after a change of talker, while on the other hand the transmission of information on the downlink DL channel is of particular benefit at precisely such times. The assigning of additional slots to the channel DL at the start of a period of alternation thus enables information such as the identity of the talker or, in the case of an encryption system with external synchronization, the vector for initializing the decryption system, to be transmitted as frequently as possible. The problems related to gaps due to poor radio propagation conditions are thus addressed. The effectiveness and comfort for the user of the function of late entry to a group communication are also increased.

For the regularity of the structure of the timeslots, the control bits $X_1$, $X_2$, $Y_1$, $Y_2$ can be inserted into each of the timeslots of the traffic frame on the carrier $f_{TD}$ (as in the case of the control frame on the carrier $f_{CD}$), even though just some of them suffice for coding the assignment of the ninth composite slot.

The invention claimed is:

1. A method of transmitting radio signals between a base station and mobile terminals,
   wherein signals transmitted from the base station to at least one of the mobile terminals are transmitted on a first frequency and
   signals transmitted from at least one of the mobile terminals to the base station are transmitted on a second frequency,
   the transmissions on the first and second frequencies being performed according to a frame structure comprising timeslots of like duration,
   wherein the first frequency carries a downlink logical traffic channel to at least one of the mobile terminals and
   the second frequency carries an uplink logical traffic channel from one of the mobile terminals,
   wherein the first frequency further carries
      a first downlink logical signaling channel to one of the mobile terminals
      during the transmission phase on the uplink logical traffic channel and
      a second downlink logical signaling channel to at least one of the mobile terminals
      during the reception phase on the downlink logical traffic channel,
   wherein the second frequency further carries
      a first uplink logical signaling channel from at least one of the mobile terminals
      during the reception phase on the downlink logical traffic channel and
      a second uplink logical signaling channel from one of the mobile terminals
      during the transmission phase on the uplink logical traffic channel, and
   wherein the first downlink and uplink logical signaling channels are each carried by a first timeslot of the frame structure,
   while the second downlink and uplink logical signaling channels are each carried by a second timeslot of the frame structure,
   distinct from said first timeslot.

2. The method as claimed in claim 1, wherein the frame structure comprises, in addition to said first and second timeslots, timeslots dedicated to the logical traffic channels, and at least one timeslot forming a listening window in which the mobile terminals listen to signals transmitted from other base stations.

3. The method as claimed in claim 2, wherein the signals transmitted from other base stations and which are searched for by the mobile terminals during the listening window comprise synchronization patterns which are transmitted with a periodicity of M times said duration of the timeslots, M being a number prime to the number of timeslots of the frame structure.

4. The method as claimed in claim 2, wherein each of the timeslots dedicated to the logical traffic channels is a composite timeslot which comprises a first elementary slot for the downlink logical traffic channel followed by a second elementary slot for the uplink logical traffic channel, and wherein the first timeslot carrying the first downlink and uplink logical signaling channels is a composite timeslot which comprises a first elementary slot for the first uplink logical signaling channel followed by a second elementary slot for the first downlink logical signaling channel.

5. The method as claimed in claim 2, wherein each of the timeslots dedicated to the logical traffic channels is a composite timeslot which comprises a first elementary slot for the uplink logical traffic channel followed by a second elementary slot for the downlink logical traffic channel, and wherein the first timeslot carrying the first downlink and uplink logical signaling channels is a composite timeslot which comprises a first elementary slot for the first downlink logical signaling channel followed by a second elementary slot for the first uplink logical signaling channel.

6. The method as claimed in claim 4, wherein the second timeslot carrying the second downlink and uplink logical signaling channels respectively comprises two elementary slots for the second downlink and uplink logical signaling channels.

7. The method as claimed in claim 2, wherein the frame structure comprises a programmable timeslot scheduled for the transmission on at least the first uplink logical signaling channel, and wherein the base station transmits, during the timeslots dedicated to the logical traffic channels, access control signals for controlling access to said programmable timeslot by the mobile terminals in the reception phase.

8. The method as claimed in claim 7, wherein said access control signals comprise signals for authorizing the mobile terminals in the reception phase to transmit during a next programmable timeslot, and signals for apprising of the processing of requests made by the mobile terminals in the reception phase during a previous programmable timeslot.

9. The method as claimed in claim 7, wherein at least one programmable timeslot, during which the mobile terminals in the reception phase are not authorized to transmit, is assigned to the first downlink logical signaling channel.

10. The method as claimed in claim 7, wherein at least one programmable timeslot, during which the mobile terminals in the reception phase are not authorized to transmit, is assigned to the second downlink logical signaling channel.

11. The method as claimed in claim 7, wherein the logical traffic channels are used in alternate mode, with successive alternations during which only one of the mobile terminals is in the transmission phase on the uplink logical traffic channel while one or more of the mobile terminals are in the reception phase on the downlink logical traffic channel, and wherein the base station transmits access control signals in such a way as to restrict the transmissions of the mobile terminals during the programmable timeslots in an initial period of an alternation with respect to the rest of the alternation.

12. A radiocommunication base station, comprising
means for transmitting radio signals on a first frequency to at least one mobile terminal, and
means for receiving radio signals on a second frequency from at least one mobile terminal,
the transmissions on the first and second frequencies being performed according to a frame structure comprising timeslots of like duration,
wherein the first frequency carries a downlink logical traffic channel from the base station,
wherein the second frequency carries an uplink logical traffic channel to the base station,
wherein the first frequency further carries
  a first downlink logical signaling channel to a mobile terminal
    during the transmission phase on the uplink logical traffic channel and
  a second downlink logical signaling channel to at least one mobile terminal
    during the reception phase on the downlink logical traffic channel,
wherein the second frequency further carries
  a first uplink logical signaling channel from at least one mobile terminal
    during the reception phase on the downlink logical traffic channel and
  a second uplink logical signaling channel from a mobile terminal
    during the transmission phase on the uplink logical traffic channel, and
wherein the first downlink and uplink logical signaling channels are each carried by a first timeslot of the frame structure,
while the second downlink and uplink logical signaling channels are each carried by a second timeslot of the frame structure,
distinct from said first timeslot.

13. A radiocommunication mobile terminal, comprising
means for receiving radio signals on a first frequency from a base station, and
means for transmitting radio signals on a second frequency to the base station,
the transmissions on the first and second frequencies being performed according to a frame structure comprising timeslots of like duration,
wherein the first frequency carries a downlink logical traffic channel to the mobile terminal,
wherein the second frequency carries an uplink logical traffic channel from the mobile terminal,
wherein the first frequency further carries
  a first downlink logical signaling channel to the mobile terminal
    during the transmission phase on the uplink logical traffic channel and
  a second downlink logical signaling channel to the mobile terminal
    during the reception phase on the downlink logical traffic channel,
wherein the second frequency further carries
  a first uplink logical signaling channel from the mobile terminal
    during the reception phase on the downlink logical traffic channel and
  a second uplink logical signaling channel from the mobile terminal
    during the transmission phase on the uplink logical traffic channel, and
wherein the first downlink and uplink logical signaling channels are each carried by a first timeslot of the frame structure,
while the second downlink and uplink logical signaling channels are each carried by a second timeslot of the frame structure,
distinct from said first timeslot.

14. The method as claimed in claim 5, wherein the second timeslot carrying the second downlink and uplink logical signaling channels respectively comprises two elementary slots for the second downlink and uplink logical signaling channels.

\* \* \* \* \*